US008819061B2

(12) United States Patent
Benson et al.

(10) Patent No.: US 8,819,061 B2
(45) Date of Patent: Aug. 26, 2014

(54) CLOUD-BASED SKIP TRACING APPLICATION

(71) Applicant: Innovation Software, LLC, Cedar Falls, IA (US)

(72) Inventors: Chad Benson, Cedar Falls, IA (US); Mike Frost, Cedar Falls, IA (US)

(73) Assignee: Innovation Software, LLC, Cedar Falls, IA (US)

( * ) Notice: Subject to any disclaimer, the term of this patent is extended or adjusted under 35 U.S.C. 154(b) by 119 days.

(21) Appl. No.: 13/645,141

(22) Filed: Oct. 4, 2012

(65) Prior Publication Data

US 2014/0101198 A1 Apr. 10, 2014

(51) Int. Cl.
*G06F 17/30* (2006.01)
*G06Q 30/06* (2012.01)

(52) U.S. Cl.
CPC ...... *G06F 17/30206* (2013.01); *G06Q 30/0609* (2013.01)
USPC ......................................................... 707/770

(58) Field of Classification Search
None
See application file for complete search history.

(56) References Cited

U.S. PATENT DOCUMENTS

| | | | |
|---|---|---|---|
| 7,386,102 B2 | 6/2008 | Summe et al. | |
| 7,526,439 B2 | 4/2009 | Freishtat et al. | |
| 8,165,272 B2 | 4/2012 | Lindsey et al. | |
| 8,204,809 B1 * | 6/2012 | Wise | 705/35 |
| 2001/0011245 A1 | 8/2001 | Duhon | |
| 2004/0260602 A1 * | 12/2004 | Nakaminami et al. | 705/11 |
| 2005/0222947 A1 | 10/2005 | Regan | |
| 2006/0188081 A1 | 8/2006 | Hooper et al. | |
| 2006/0277092 A1 * | 12/2006 | Williams | 705/10 |
| 2007/0130070 A1 | 6/2007 | Williams | |
| 2007/0156557 A1 | 7/2007 | Shao et al. | |
| 2007/0162377 A1 | 7/2007 | Williams | |
| 2008/0077525 A1 | 3/2008 | Willey et al. | |
| 2008/0189296 A1 * | 8/2008 | Cloutier et al. | 707/10 |
| 2008/0270279 A1 * | 10/2008 | Rowe et al. | 705/35 |
| 2010/0010861 A1 | 1/2010 | Zhang et al. | |
| 2010/0094910 A1 * | 4/2010 | Bayliss | 707/800 |
| 2010/0211484 A1 | 8/2010 | Malcolm et al. | |
| 2010/0241454 A1 * | 9/2010 | Firminger et al. | 705/3 |
| 2011/0035341 A1 | 2/2011 | Tilton | |
| 2012/0011040 A1 | 1/2012 | Beydler et al. | |

OTHER PUBLICATIONS

"TEC Announces New Skip Trace Optimization Service," TEC Services Group, Inc., http://www.tecsg.com/our_news_blog/tec-announces-new-skip.html, Apr. 26, 2011.*
Lippman, "Modern Day Skip Tracing and Asset Locating", The National List of Attorneys, Developing A Collection Practice booklet, May 2008.*
Innovation Software, LLC, PCT/2013/059642 filed Sep. 13, 2013, "The International Search Report and The Written Opinion of The International Searching Authority, or The Declaration", mail date Mar. 28, 2014.

* cited by examiner

*Primary Examiner* — Jay Morrison
(74) *Attorney, Agent, or Firm* — McKee, Voorhees & Sease

(57) ABSTRACT

A method executed at least in part in a computing device for providing cloud based skip tracing is provided. The method includes providing a cloud based service enabling data interchange with a plurality of vendors providing skip tracing services and receiving at the cloud based service and from a user a file of records for skip tracing. The method further includes applying a waterfall process to the records using the computing device wherein the waterfall process includes at least a subset of the plurality of vendors and returning to the user a results file containing skip tracing results corresponding to the records. The method may further include generating a waterfall score card and sending the waterfall score card to the user, the waterfall score card summarizing performance of the subset of the plurality of vendors.

11 Claims, 15 Drawing Sheets

CLOUD-BASED SKIP TRACING APPLICATION

FIELD OF THE INVENTION

The present invention relates to a cloud-based skip tracing application. More particularly, but not exclusively, the present invention relates to a cloud-based skip tracing application which allows a user to interact with multiple data vendors in a waterfall process.

BACKGROUND OF THE INVENTION

Skip tracing often involves using numerous different databases or other vendor services to identify accurate and current information for an individual. Because not all information is available from a single source there are numerous complexities introduced into the skip tracing process. This can include determining which vendors to use as some vendors may be more likely to have certain information than other vendors. This can also include determining the order of vendors to use when more than one vendor is used. There may be additional concerns regarding different vendor services including the time it takes with a particular vendor, the cost of using a particular vendor, and other concerns. Moreover, the more vendors that have to be used in order to identify information, the longer the process takes.

What is needed is an improved method, apparatus, and system for performing skip tracing.

SUMMARY OF THE INVENTION

Therefore, it is a primary object, feature, or advantage of the present invention to improve over the state of the art.

It is a further object, feature, or advantage of the present invention that provides for a cloud-based solution to skip-tracing.

Another object, feature, or advantage of the present invention is to provide a platform for skip tracing which allows a user to interface with multiple data vendors.

Yet another object, feature, or advantage of the present invention is to deliver B2B, analytically-driven skip data to the customer in one robust platform.

A further object, feature, or advantage of the present invention is to bring together multiple skip vendors through a unique waterfall process.

A still further object, feature, or advantage of the present invention is to provide optimal waterfall processes designed for various purposes-specific industries, based on account characteristics, and/or skipped product type.

Another object, feature, or advantage of the present invention is to provide users the ability to adjust waterfall settings to suit the purpose of their skip searches.

Yet another object, feature, or advantage of the present invention is to provide a service which can be accessed via an easy-to-use, web-based application and allows the user to control their skip tracing process to meet their company's needs.

One or more of these and/or other objects, features, or advantages of the present invention will become apparent from the specification and claims that follow.

According to one aspect, the present invention provides a cloud-based application that focuses on delivering business-to-business (B2B), analytically-driven skip data to the customer in one robust platform by allowing a user to simply interface with multiple data vendors. The invention brings together multiple skip vendors through a waterfall process. Using analytics, optimal waterfall processes may be designed for various purposes (including to meet different and specific industry needs) based on account characteristics, and/or skipped product type. A user has the option of adjusting the waterfall settings to meet the purpose of their skip searches.

The cloud-based application is preferably an easy-to-use web-based application. Through the application the user is given the ability to control the skip tracing process in a manner that meets their needs. This may include creating different waterfalls by selecting service level and product packages. Thus, a user can access multiple skip tracing sources through a single interface. The waterfall process may include a number of different vendors and a specified sequence of vendors. Thus, a client input file may pass through multiple vendors until a hit is returned. When a record within the client input file receives a hit, it may be returned to the client, while the rest of the records in the client input file are sent onto the next vendor in the waterfall. This process continues until the last vendor in a waterfall has been skipped.

Data may be stored at the record level and be used for any number of purposes including reporting to the client, analytic-based research for optimizing waterfalls, and development of models to use in driving the waterfall process, for example.

According to another aspect of the present invention, a method executed at least in part in a computing device for providing cloud based skip tracing is provided. The method includes providing a cloud based service enabling data interchange with a plurality of vendors providing skip tracing services and receiving at the cloud based service and from a user a file of records for skip tracing. The method further includes applying a waterfall process to the records using the computing device wherein the waterfall process includes at least a subset of the plurality of vendors and returning to the user a results file containing skip tracing results corresponding to the records. The method may further include generating a waterfall score card and sending the waterfall score card to the user, the waterfall score card summarizing performance of the subset of the plurality of vendors.

According to another aspect of the present invention, an apparatus is provided. The apparatus includes a server operatively connected to a network. The server is configured for providing cloud-based skip tracing.

DETAILED DESCRIPTION

Figure 1:
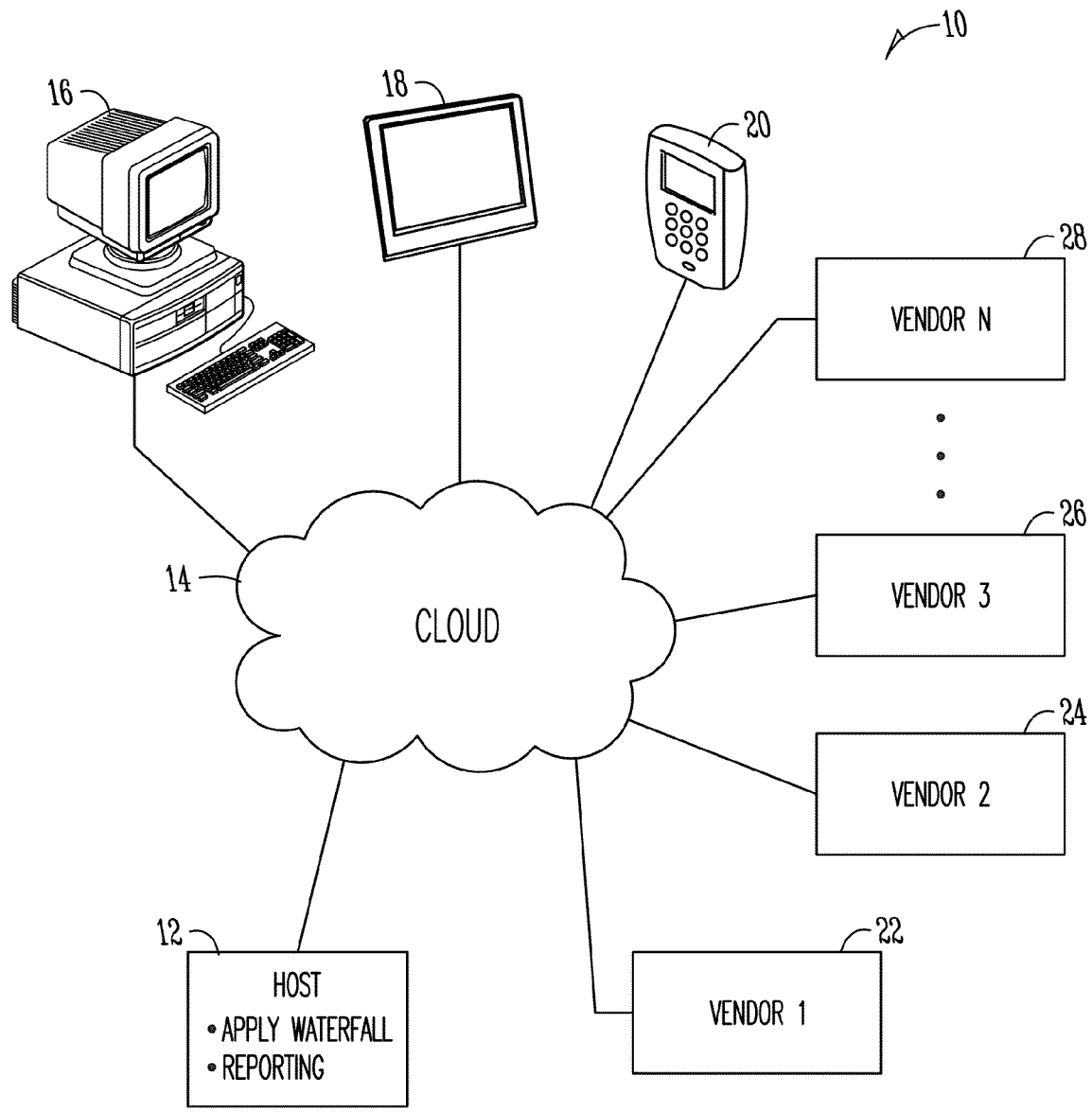
FIG. 1 is a diagram illustrating one example of a system of the present invention.

FIG. 1 illustrates one example of the present invention. In FIG. 1, a system 10 is shown which includes a host 12. The host 12 may be a web server or other type of server or other computing device which is operatively connected to the "cloud" 14. As used herein, the "cloud" refers to a network such as a wide area network such as the Internet. Various client devices such as computers 16, tablets 18, smart phones 20, or other computing devices may also be in operative communication with the cloud 14. Also shown in FIG. 1 are a number of vendors 22, 24, 26, 28. These vendors may provide various services for skip tracing through online or electronic databases or other means. These vendors may offer their services through the cloud 14 to the host 12, although the services may otherwise be provided.

Figure 2:
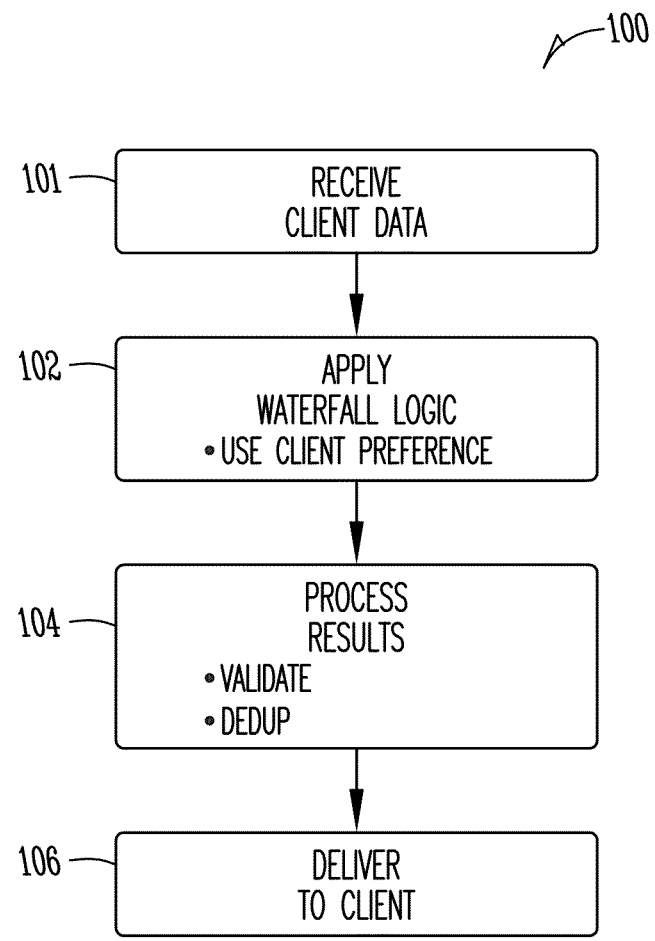
FIG. 2 is a diagram illustrating one example of a method.

The host 12 preferably has an associated computer readable storage medium with instructions for performing various functions or methods as described herein. FIG. 2 illustrates an example of a process 100 which the host 12 may be programmed to perform. In step 101 client data is received. The client data may be in the form of a file containing names and/or other information or records. In step 102 waterfall logic is applied. The waterfall logic applied may be based on client preferences, default logic, or other logic regarding the manner in which services and products of vendors should be used in order to provide skip tracing. In step 104 results obtained from various services and products of vendors are analyzed in various ways such as to validate results and remove duplicates or dedup. Various types of validation checks may be applied in order to validate results. For example, a validation check may be performed on any phone number or address received from a vendor before passing onto the client as a result. The skipped result may be cross-checked against tables or information for legitimacy. For example, area code and prefix combinations for phone numbers may be checked to determine validity and state and zip code combinations may be checked to determine validity. Skip results that fail the validation check may be rejected and not returned to the client as a hit.

A dedup process may be used because the vendor skip searches may provide the same information for multiple records. Therefore, dedup processes guard against providing duplicate information to the client. Dedup processes may be run at the vendor and upon receipt of a hit from a vendor. Deduping may be performed on phone numbers, addresses, or email addresses. It is contemplated that for some types of information it may be preferable that dedup processes not be performed such as for results associated with products directed towards obtaining bankruptcy, deceased, or incarcerated information where the result can be relevant if the same information is returned multiple times. In addition, the dedup process may be performed against information, such as phone numbers, which are provided by the client as a part of the client data in an input file. Also, the dedup may be configured to skip results that have been previously returned to the client for a particular record.

It is further noted that cost or time constraints may be applied as a part of the waterfall logic applied. One example of a cost constraint may be that a client selects to set a maximum cost per waterfall. Such a setting allows a client to control the cost incurred per record for each waterfall. Once a record reaches the maximum cost, the record is rejected from skip tracing and returned to the client. Thus, the maximum cost per waterfall is one example of a cost constraint that may be set.

One example of a time constraint may be allowing a client to set a time frame for receiving results files. This constraint may be used to return to the client a results file if the time limit has expired before the waterfall finishes processing. The waterfall will continue to process and return any results in a separate file. This feature also provides a failsafe mechanism against, potential vendors' processing issues. Due to the waterfall process being dependent on multiple vendors, if one of those vendors is having system issues, processing may still continue without delaying the return of results to the client.

Returning to FIG. 2, in step 106, after processing, results may be delivered to the client. The present invention further contemplates any number of different types of reporting. One such example may be a processing report. A processing report may be an automated report sent back to client to show results of files submitted. This report may be by file and may include the file's batch number, hits, and number of phone numbers received. This report may be kept by the client for reconciliation purposes. Another type of report, may be an at-a-glance report. An at-a-glance report may be a static report that is viewed through the cloud-based service and may provide an overview of the waterfall statistics for a given time period. Preferably an at-a-glance report provides summary information for the most used waterfalls based on number of records submitted. Other reports may include dynamic reports such as those that a user may create. In addition, reports may be generated from result data returned to the client to show waterfall accuracy statistics as will be later explained herein.

Thus, a cloud-based service is provided which manages the data interchange with a plurality of vendors providing skip tracing services according to waterfall logic which identifies and/or sequences different products and services of the different vendors.

Figure 3:
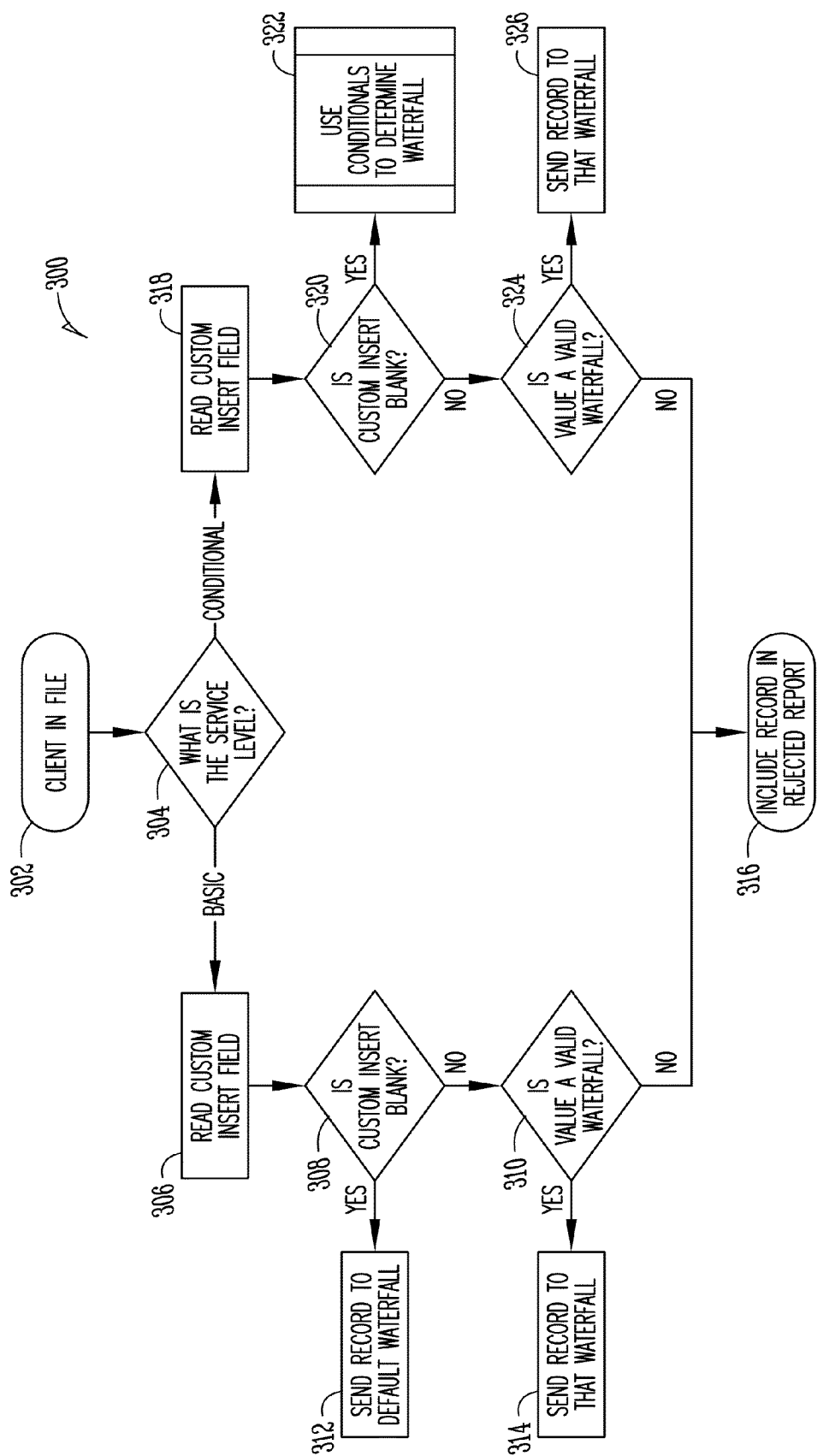
FIG. 3 is a flow diagram illustrating a method for processing a client input file.

FIG. 3 illustrates a process 300 which may be performed when a client provides a data file. In step 302 the incoming file 302 from the client is shown. In step 304, a determination is made as to what service level is requested. The present invention contemplates that any number of different service levels may be provided and different features may be provided based on the service level. In this example, a basic service level is provided and a conditional service level is provided. Both service levels provide for deduping skip information, validating phone numbers and addresses and dynamic reporting. The basic level of service uses an automatic skip trace waterfall. The conditional service level allows the client to customize the application of the waterfall logic. If the service level is basic, then in step 306 a custom insert field may be read, the customer insert field may be used to specify a particular waterfall to use. The custom insert field may include a waterfall indicator code to indicate a particular waterfall to use. In step 308 a determination is made as to whether the custom insert field is blank. If it is, then in step 312 the record may be sent to be processed using a default waterfall. Alternatively, if the custom insert is not blank then in step 310 a determination is made as to whether the value in that field is a valid waterfall. If it is then the record may be processed using the specified waterfall. If the value is not a valid waterfall then in step 316 a rejected report may be generated including reporting on the fact that the specified waterfall was not recognized as valid.

Returning to step 304, a determination may be made that the service level is conditional. When the service level is condition, users may customize the application of the waterfalls such as to use more than one waterfall per product package without creating multiple files. If the service level is conditional, then in step 318 the custom insert field may be read. In step 320 a determination is as to whether or not custom insert field is blank. If it is, then in step 322 conditionals may be used to determine the appropriate waterfall. If not then in step 324 a determination is made as to whether the value within the field is associated with a valid waterfall. If it is then in step 326 the record may be sent to the waterfall. If it is not then in step 316 information about the invalid entry may be included in a report.

Figure 4:
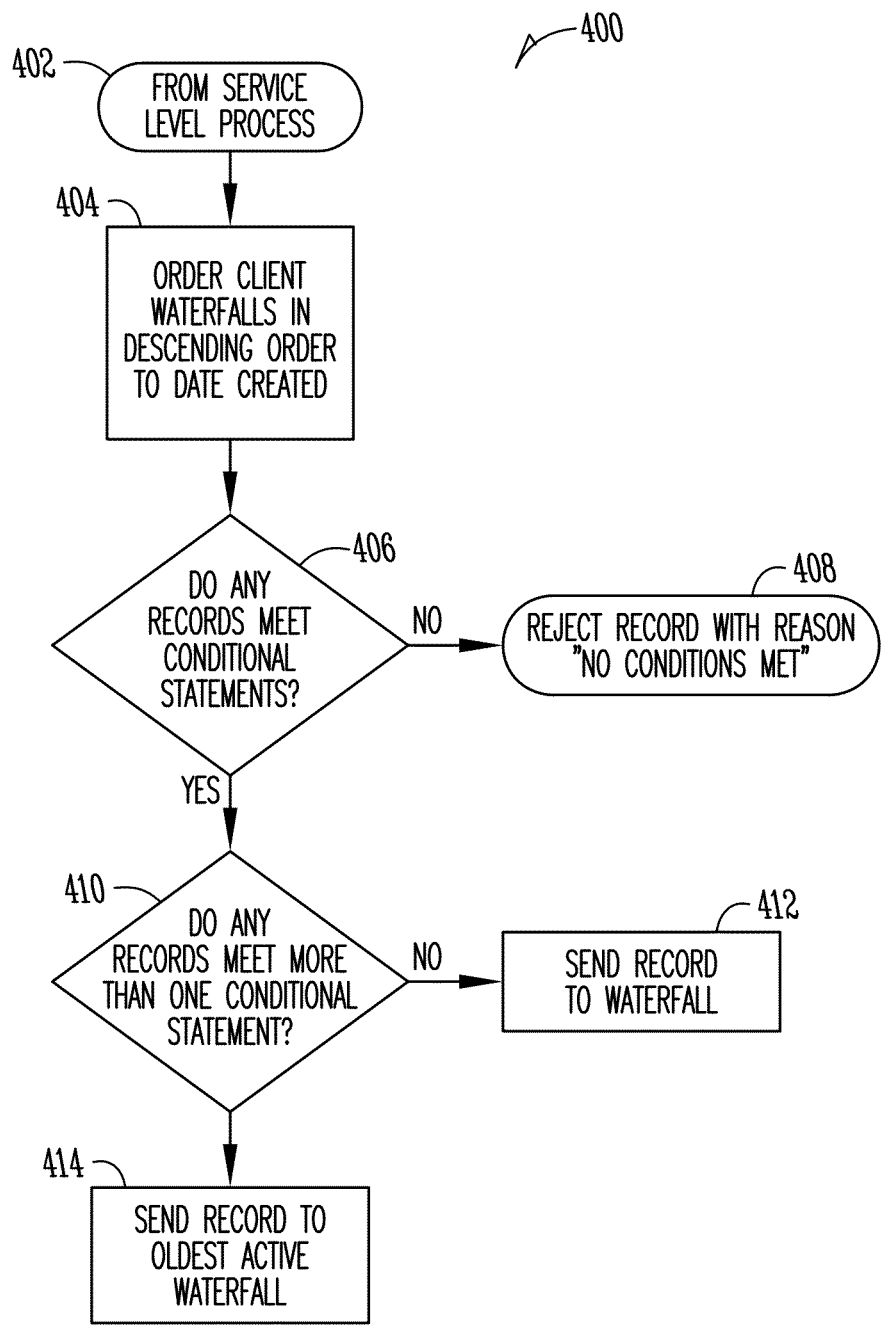
FIG. 4 is a flow diagram illustrating processing of a record.

FIG. 4 illustrates a method 400 for further processing records. In step 402 records from the service level process shown in FIG. 3 may be received. In step 404, client waterfalls may be ordered in descending order to the date created. In step 406 a determination is made as to whether records meet the conditional statements. If not then in step 408 any record which does not meet the conditional statements may be rejected. For records which meet conditional statements, in step 410 a determination is made as to whether records meet more than one conditional statement. If not, then the records may be sent to the waterfall in step 412. If the records do meet more than one conditional statement, then in step 414 the records are sent to the oldest active waterfall in step 414.

Figure 5A:
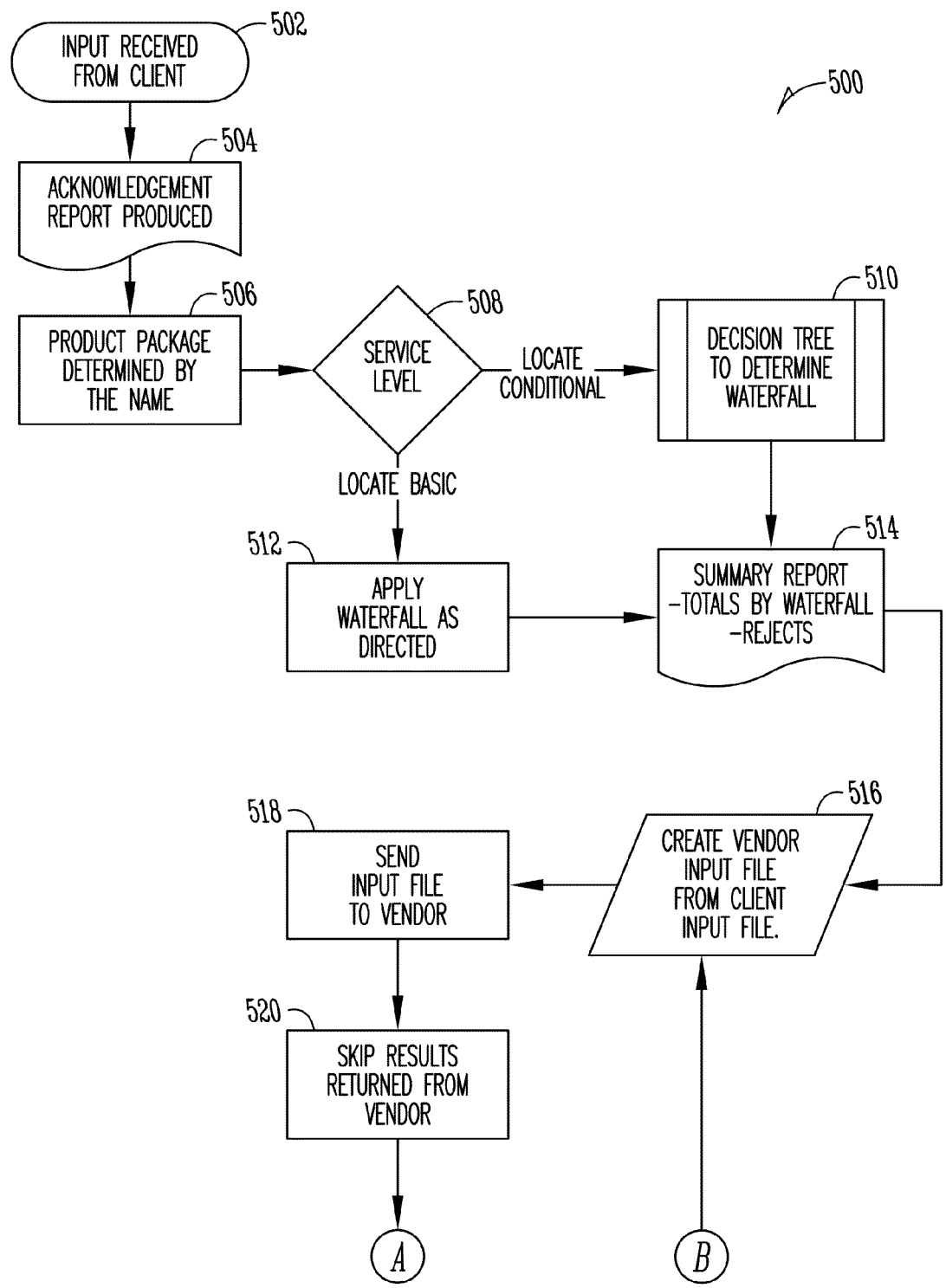
FIGS. 5A and 5B illustrate a method for processing an input file.
Figure 5B:
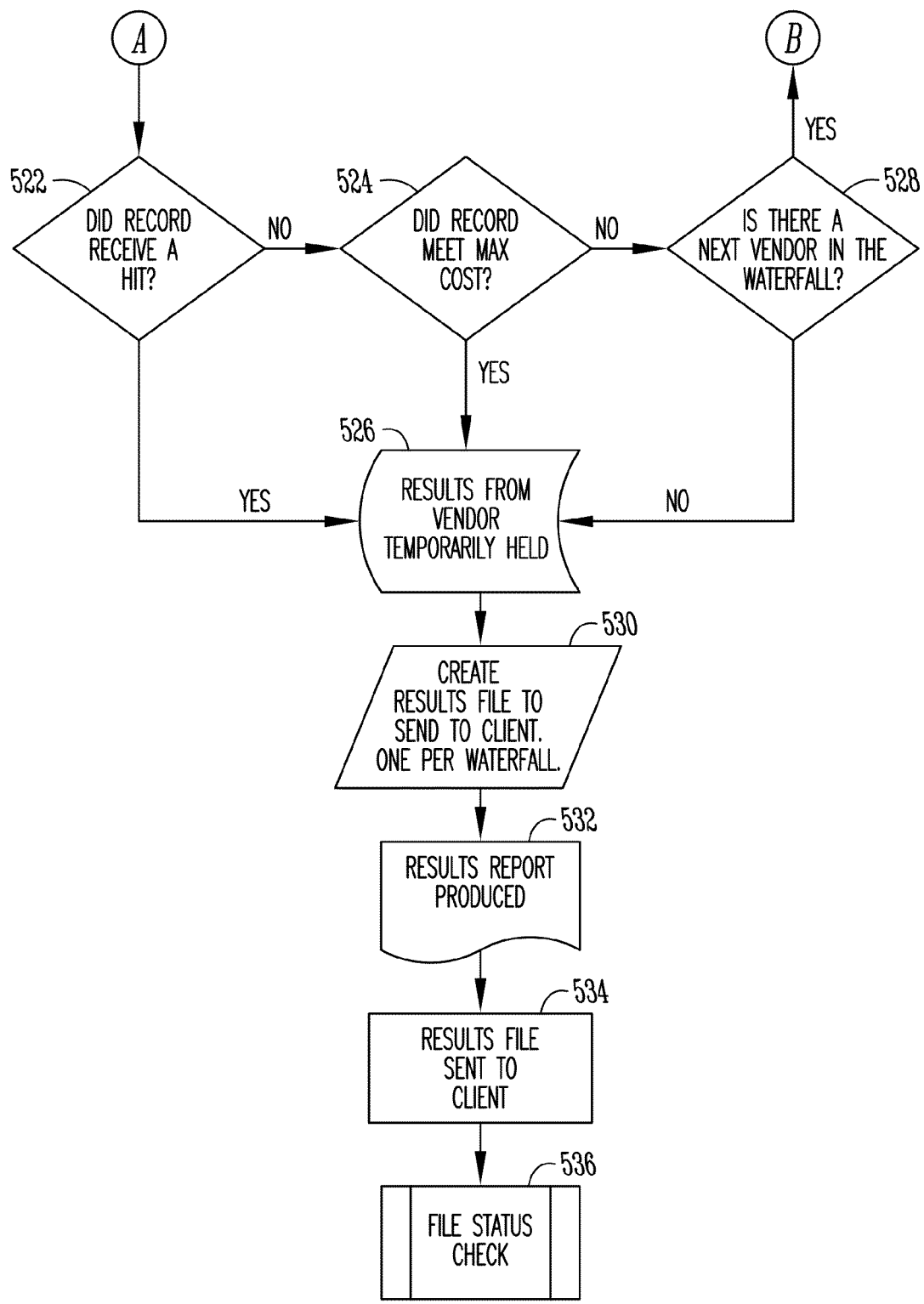

FIGS. 5A and 5B illustrate a method 500. In step 502, input is received from a client. In step 504 an acknowledgement report may be produced. Such a report may be communicated to the client. In step 506 a product package may be determined by the name of the input file although the present invention contemplates that product packages may otherwise be identified. Product packages may be pre-determined combinations of skip tracing product offerings. The package selected is used to determine the information on which the skip activity will be conducted. It may be used as an indicator of what vendors are available for any particular waterfall. In step 508 a determination may be made as to the service level such as basic or conditional. If the service level is conditional then in step 510 a decision tree may be used to determine a waterfall. Returning to step 508, if the service level is basic then in step 512 a waterfall may be applied as directed.

In step 514 a summary report may be generated which may include totals by waterfall, the records which were rejected, or other information. Then in step 516 a vendor input file may be created from the client input file. In step 518 the input file may be sent to a vendor. In step 520 skip results may be returned from the vendor. Next, as shown in FIG. 5B, in step 522 a determination is made as to whether a record received a hit. If not then in step 524 a determination is made as to whether the cost after obtaining the record meets the maximum allowable cost. If not then in step 528 a determination is made as to whether there is a next vendor in the waterfall. If there is then the process returns to step 516 in FIG. 5A by creating a vendor input file from the client input file for the next vendor. If there are no more vendors in the waterfall then the process proceeds to step 526 where results from the vendor are temporarily held. Returning to step 522, if the record did receive a hit then the process also continues to step 526. Returning to step 524 if the record does meet the maximum allowable cost the process also continues to step 526. After the results from the vendor are temporarily held in step 526, in step 530 a results file may be created to send to a client. A separate results file may be provided for each waterfall. In step 532, a results report is produced. In step 534 the results file may be sent to the client. In step 536 a file status check may be performed.

Figure 6:
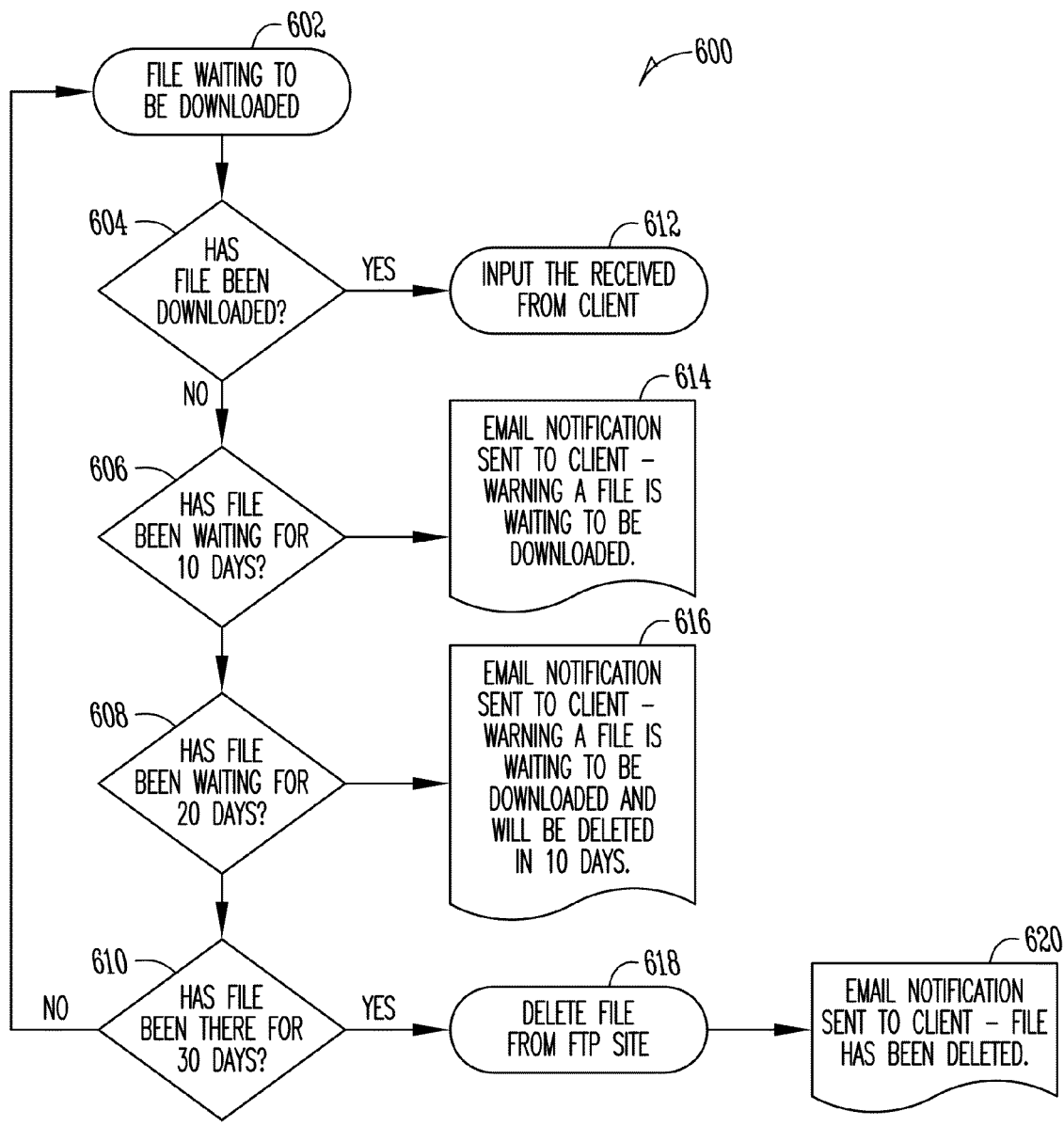
FIG. 6 illustrates a method relating to a results file prepared for a client.

FIG. 6 illustrates a method 600 for managing a result file which is made available to a client such as on a file transfer protocol (ftp) site or a secure file transfer protocol (sftp) site.

As shown in FIG. 6, at step 602 a file is waiting to be downloaded. In step 604, a determination is made as to whether or not the file has been downloaded. If it has, then the received information from the client may be input. If it has not been downloaded, in step 606 a determination is made as to whether the file has been waiting for a set period of time (such as 10 days in this example). If it has, then in step 614, a notification may be sent to the client warning that the file is waiting to be downloaded. If the file is still waiting to be downloaded after another set period of time (such as 20 days total in this example), then in step 616 a notification may be sent to the client warning that the file is waiting to be downloaded and will be deleted after a set period of time (such as in 10 more days). A determination is made in step 610, a determination is made as to whether the file has been waiting for a client for another set time period (such as 30 days total in this example). If it has then in step 618 the file may be deleted from an FTP site where the file has been waiting to be downloaded by the client. In step 620 an email notification may be sent to the client that the file has been deleted.

It is to be understood that making a file available on an FTP web site is merely one way that a file may be delivered to a client. Doing so is convenient in that the client may immediately access the file if desired while at that same time recognizes that files may very large and thus not conducive to being sent via email or similar means. However, it is contemplated that files may be communicated in any number of other ways including alternative electronic means or may be delivered on physical media, or other means as may be appropriate with a particular implementation of the invention.

Figure 7A:
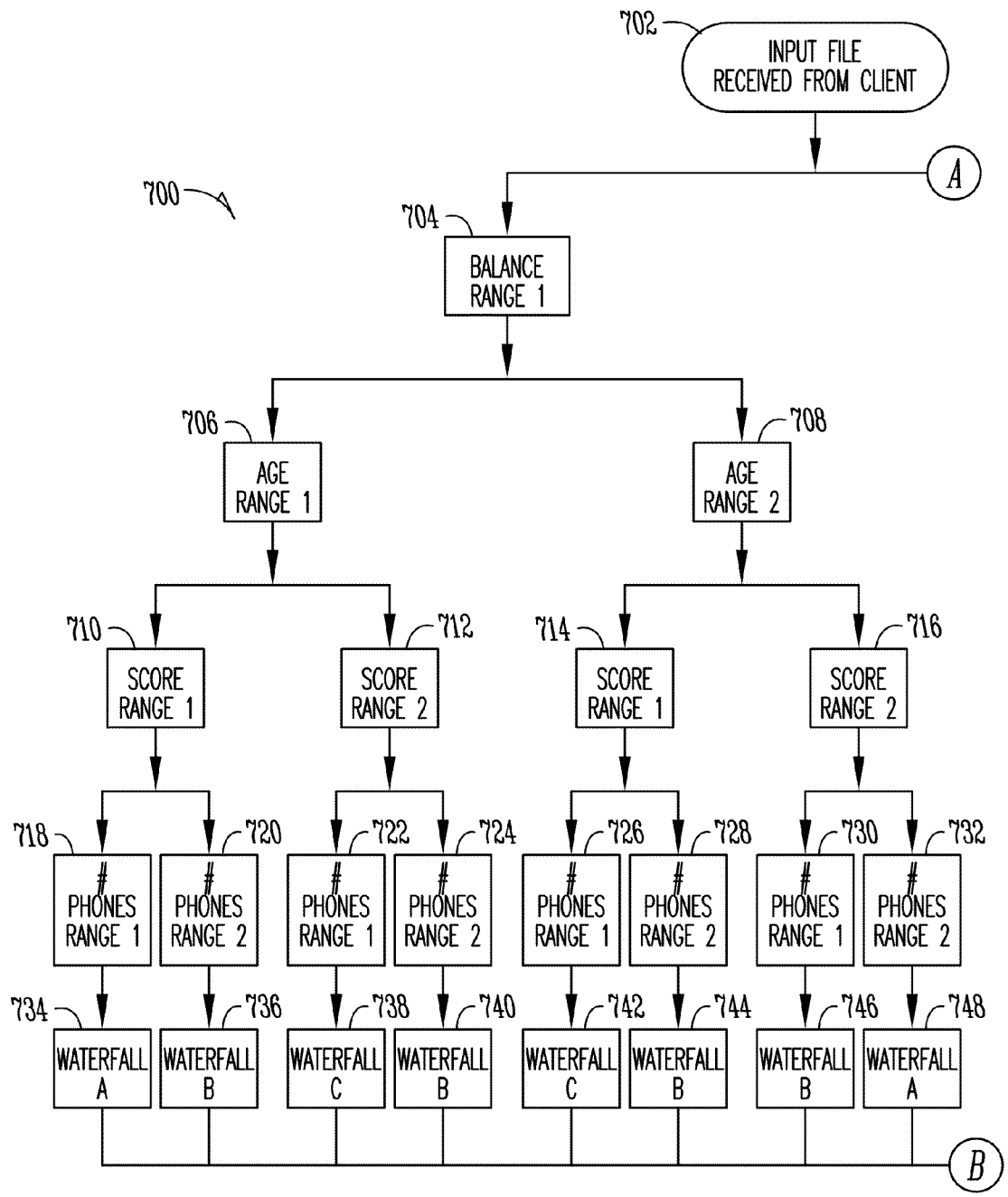
FIGS. 7A and 7B illustrate an example of decision tree with four layers of custom criteria.
Figure 7B:
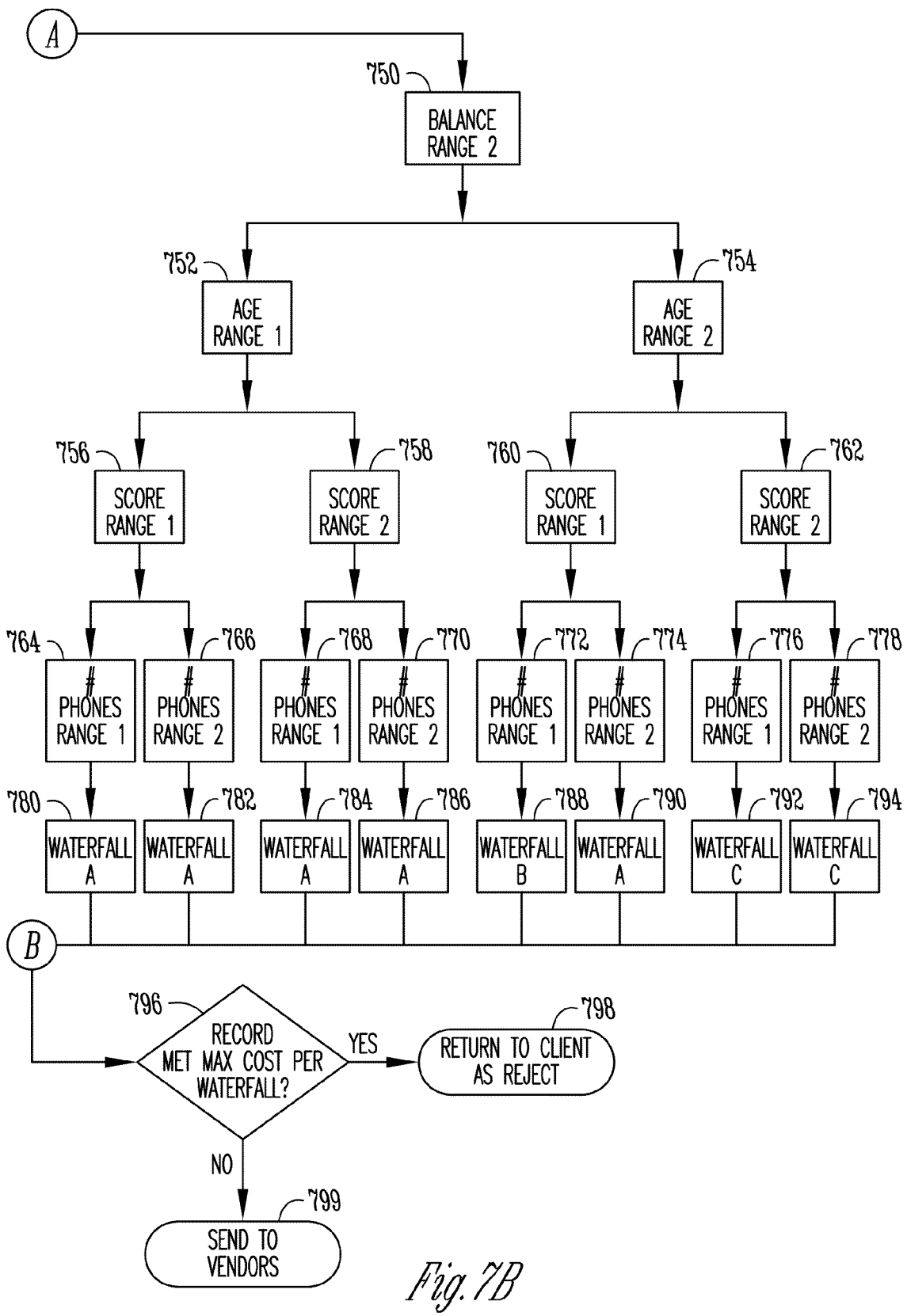

FIGS. 7A and 7B illustrate a decision tree 700 with four levels of custom criteria. Actual custom criteria used may be selected by a client and may have more or fewer levels. In step 702 an input file is received from a client. In step 704 a first balance range has an associated first age range 706 and a second age range 708. For the first age range 706, there is a first score range 710 and a second score range 712. For the second age range 708 there is a first score range 714 and a second score range 716. For the first score range 710, there is a first phone range 718 and a second phones range 720. Similarly, for the second score range 712, there is a first phones range 722 and a second phones range 724. Similarly for the first score range 714, there is a first phone ranges 726, and a second phones range 728. For the second score range 716, there is a first phones range 730 and a second phones range 732. For each phones range there is an associated waterfall 734, 736, 738, 740, 742, 744, 746, 748.

FIG. 7B illustrates a second balance range 750 with a first age range 752 and a second age range 754. For the first age range 752, there is a first score range 756 and a second score range 758. For the second age range 754, there is a first score range 760, and a second score range 762. For the first score range 765 there is a first phones range 764, a second phones range 766. For the second score range 758, there is a first phones range 768 and a second phones range 770. For the first score range 760, there is a first phones range 772 and a second phones range 774. For the second score range 762, there is a first phones range 776 and a second phones range 778. For each phone range there is an associated waterfall 780, 782, 784, 786, 788, 790, 792, 794.

After the waterfalls, in step 796 a determination made as to whether or not the record met the maximum cost per waterfall. If it has, then in step 798 the record may be returned to the client as rejected. If not, then in step 799 the record can be sent to vendors.

Figure 8:
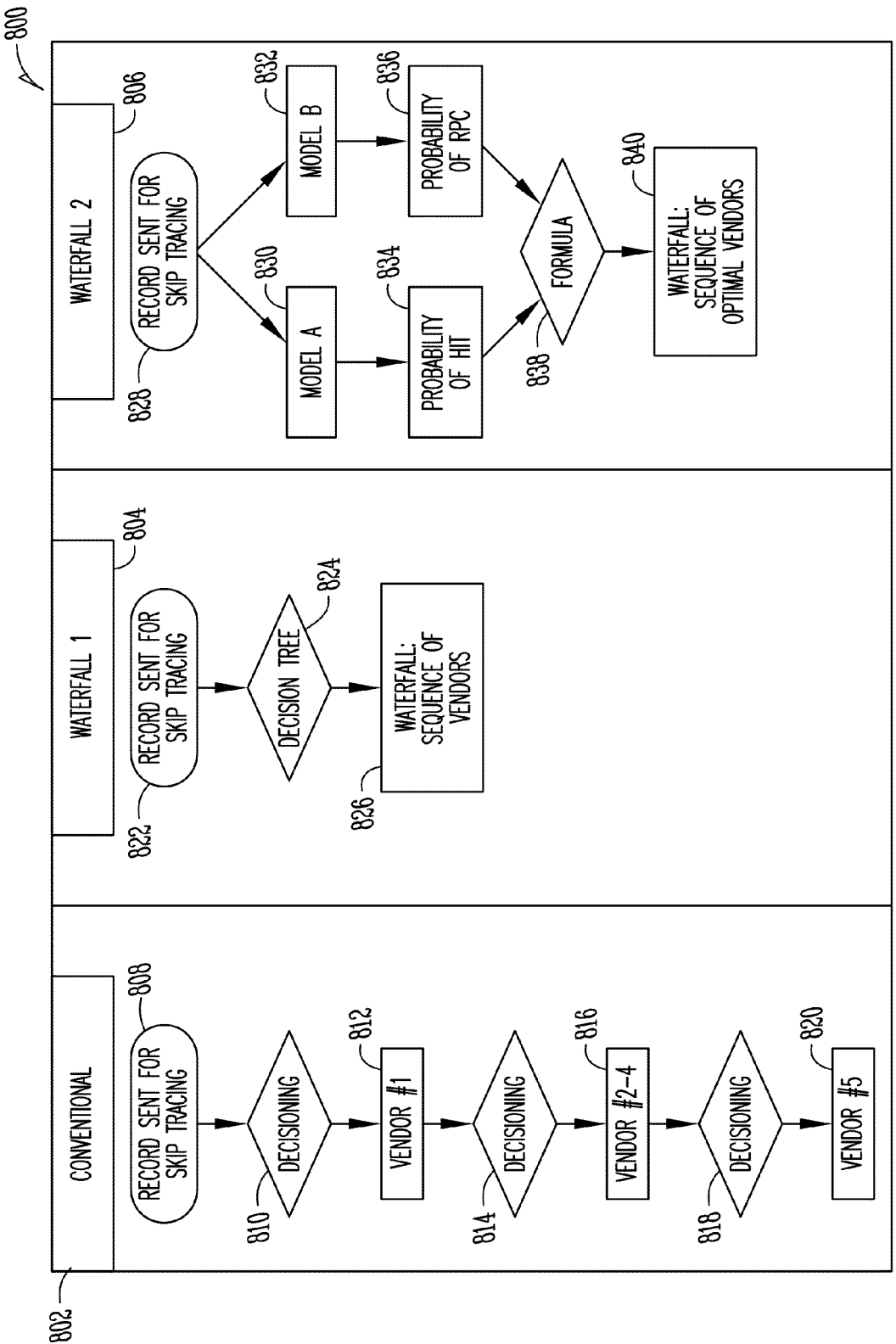
FIG. 8 illustrates three different examples of waterfall processes in comparison to a conventional process.

FIG. 8 compares a conventional process to different examples for various embodiments of a waterfall 800. A conventional process 802 is shown as well as a first waterfall process 804, and a second waterfall process 806. In the conventional process 802, a record is sent for skip tracing in step 808. In step 810 a decision is made to determine a first vendor 812. Then in step 814 a decision is made regarding additional vendors 816. In step 818, a decision is made regarding another vendor 820. Thus, the process involves a number of discrete steps regarding decisions to make at every step of the process with attendant delays every time a decision is needed.

In the first waterfall 804, in step 822, the record is sent for skip tracing. In step 824 a decision tree is applied and in step 826 a waterfall is provided which defines a sequence of vendors. In the second waterfall 806, in step 828, the record is sent for skip tracing. A first model 830 may be applied as well as a second model 832. The first model may have a probability of a hit 834 and a second model may provide a probability of RPC 836. A formula 838 may be applied to provide a waterfall 840 which includes a sequence of optimal vendors. Thus, the first waterfall 804 and the second waterfall 806 both provide significant advantages over the conventional process 802.

Figure 9:
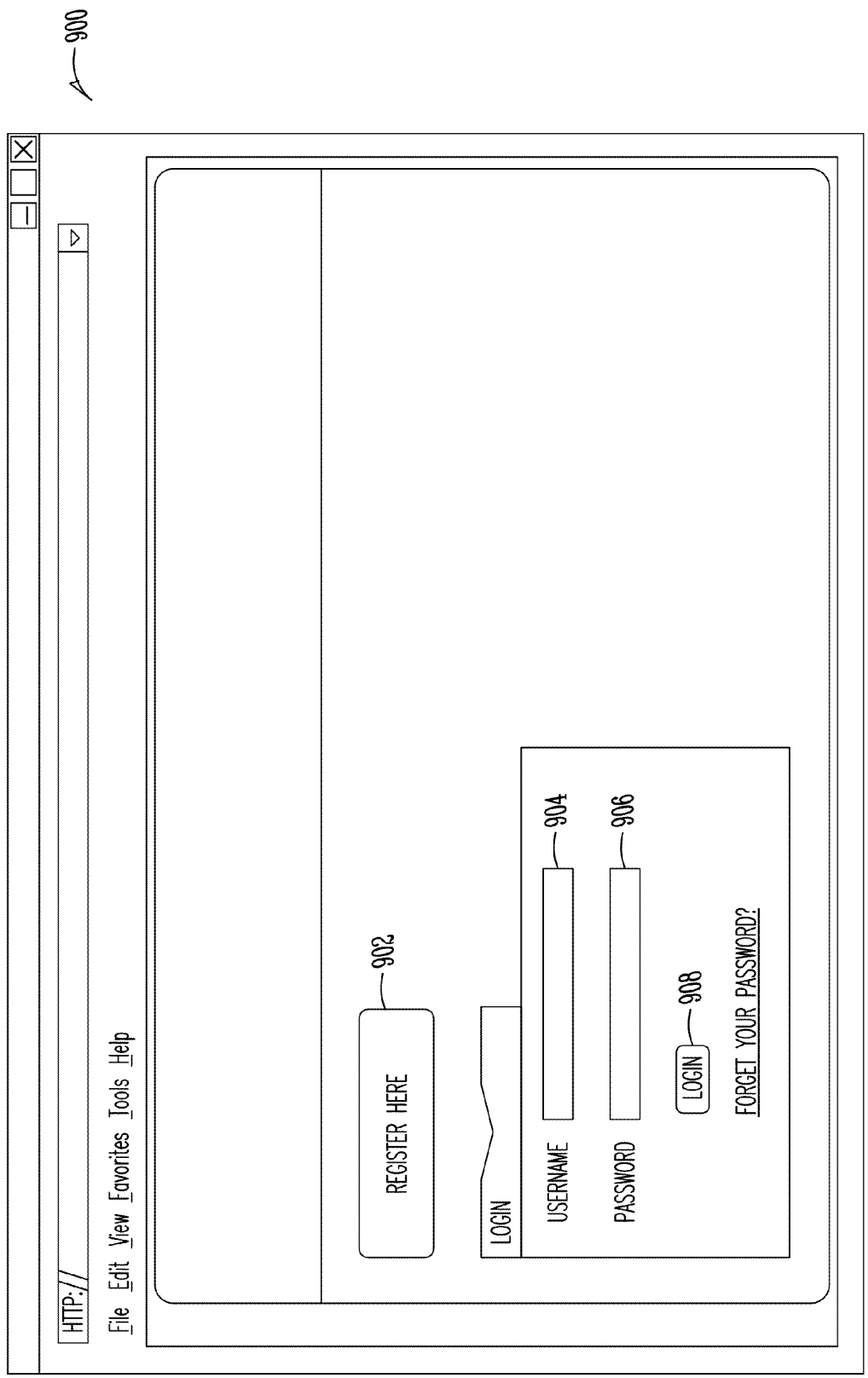
FIG. 9 is a screen display of an example of a login screen.

In FIG. 9, a screen display 900 is shown which allows a user to select a registration button 902 if they have not yet registered to use the system. If the user has already registered, then they may enter their username 904 and password 906 and select the login button 908 to login.

Figure 10:
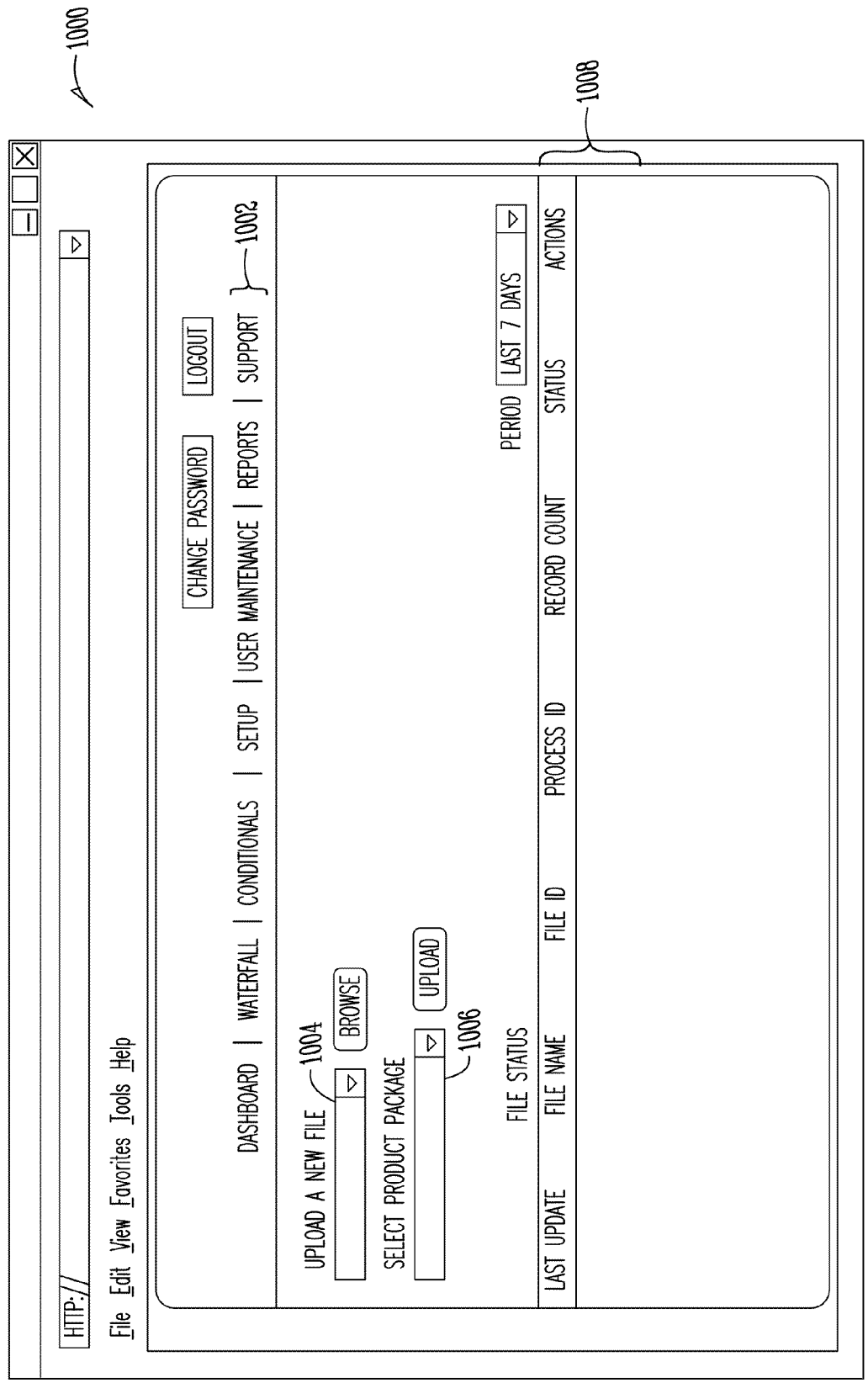
FIG. 10 is a screen display showing a dashboard.
Figure 11:
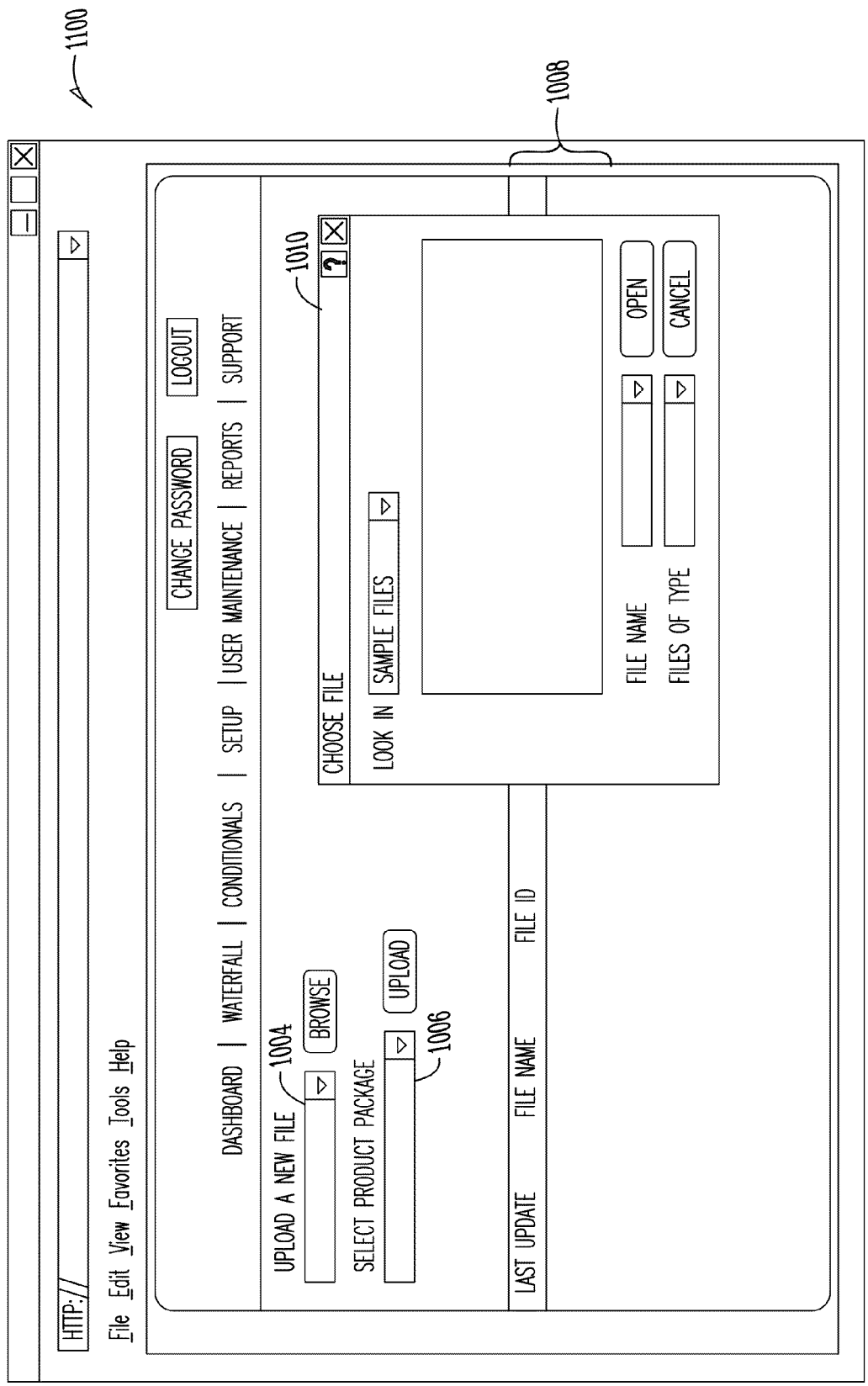
FIG. 11 is a screen display showing selection of an input file.

FIG. 10 illustrates a screen display 1000 which may be presented to a user after they have logged into the system. Menu items 1002 are presented near the top of the screen display. In addition, a user can specify a file to upload 1004. They may also select a product package 1006. In addition, file status information 1008 is provided. FIG. 11 illustrates a screen display 1100 and provides a dialog box or window 1010 where a user may choose a file to upload. The present invention contemplates that files may be uploaded in a standard or pre-defined format. In addition, it is contemplated that file map wizard or other tool may be used to allow the user to send files in any format. With such a tool a user may be taken through a series of steps to map their own file layout.

Figure 12:
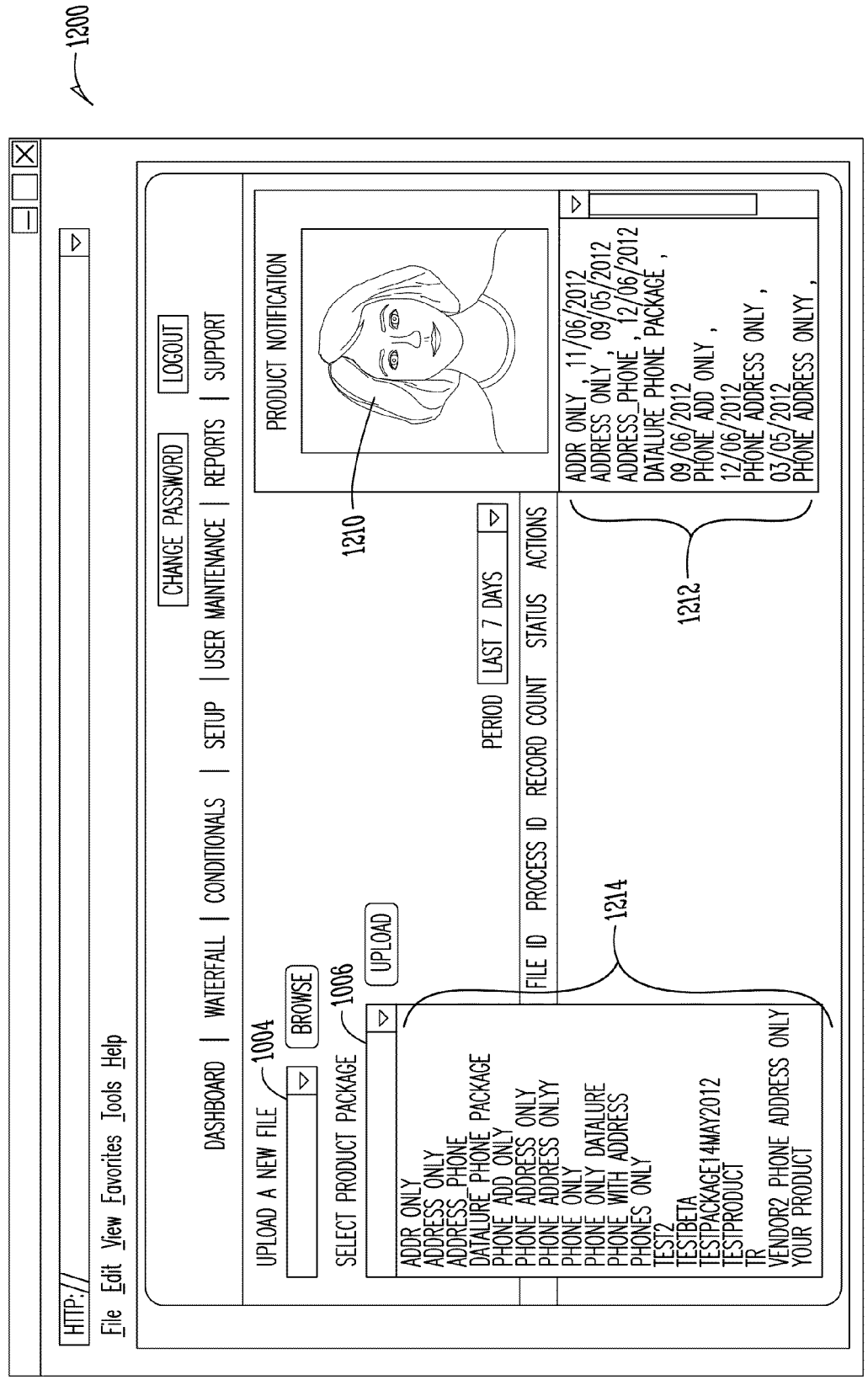
FIG. 12 is a screen display showing selections of a product package.

FIG. 12 illustrates a screen display 1200 which allows a user to select the type of product package. The present invention contemplates that various types of product packages may be used. For example, different types of product package may include the type of skip trace information to be determined. This may include address only, address and phone, phone only, email address, or other information. The type of product package may also be associated with the purpose of the search. For example the search may relate to bankruptcy, incarceration, litigation, or other purposes. The below table illustrates example of product packages and the type of skip data which may be returned. Of course, the present invention contemplates that any type of skip data may be used as may be appropriate for a particular industry or for particular circumstances.

| Product Package | Skip Data Returned |
| --- | --- |
| Phones Search | Phone Numbers |
| Contact Information | Phone Numbers |
|  | Address |
|  | Email Address |
| Place of Employment | Employer Name |
|  | Employer Address |
|  | Employer Phone Number |
|  | Employee Position |
|  | Employee Verified Flag |

| Product Package | Skip Data Returned |
| --- | --- |
| Deceased Scrub | Deceased Flag |
|  | Deceased Date |
| Incarcerated Scrub | Incarcerated Flag |
|  | Date of Incarceration |
|  | Incarcerated Location |
| Cell Phone Search | Phone Numbers |
|  | Cell Phone Indicator |
| Litigious Persons Search (Basic) | Litigious Person Indicator |
| Litigious Persons Search (Premium) | Litigious Person Indicator |
|  | Attorney Information |

Figure 13:
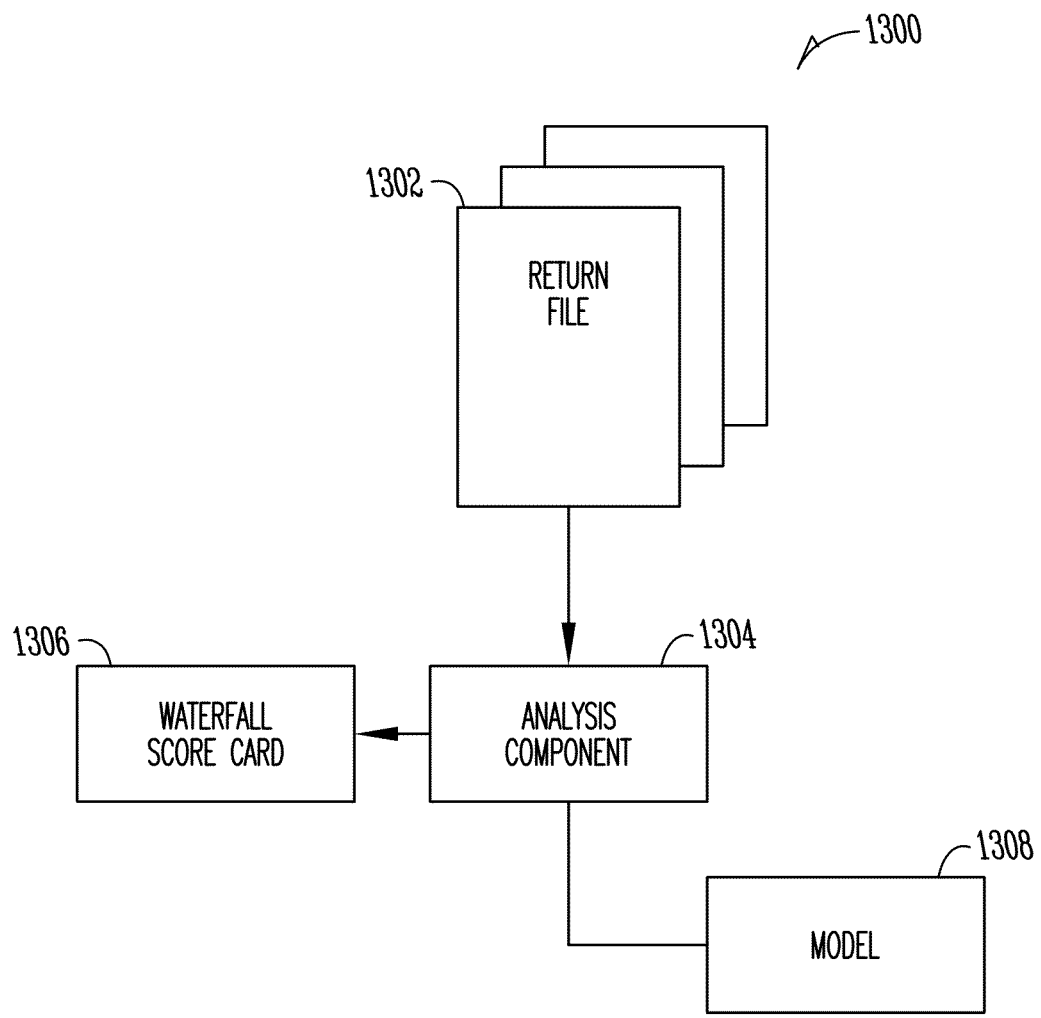
FIG. 13 is a block diagram illustrating the analysis of return files to assist in building models or waterfall score cards.

FIG. 13 illustrates a diagram illustrating, a waterfall scorecard. In system 1300 an analysis component 1304 is provided to produce a waterfall scorecard 1306. The waterfall scorecard 1306 provides for advanced level reporting on the accuracy of the skip vendors. It may use an additional return file 1302 from the client with validation information per skip result to match with the source vendor. The return file 1302 from the client may provide unique phone/account level information that identifies which phone number received which result. This data may come in transactional style. In one embodiment, the data may include: a unique identifier, a responsible party code (RPC) phone number and date, a work number phone number and date, attempt and date, any other action taken on a phone and its date. The matched data may be summarized and returned to the client. The client can use the scorecard 1306 to determine how well each of their vendors are performing, and make adjustments to their waterfall(s) as necessary. As the source information is not generally returned to the client, generic names (e.g. "generic vendor 1", "vendor 2," etc.) may be used to identify vendors in the scorecard.

Analytics may be also be used to create models based on information using the analysis component 1304. It is contemplated that data returned by a client may be either part of the collective or logically removed from all other data and not used in the collective analysis. Clients may be given a choice of being part of the collective and receiving the benefit of a large data set or not to be. The collective data will be used to create models 1308 that will predict the probability to contact the consumer. It is contemplated that models 1308 may be industry specific models, or based on other information.

A record sent for skip tracing may then use an existing model to determine the probability of a hit per vendor and the expected probability of contact per vendor. The combination of the two probabilities may be used to determine the best vendor for that record. This vendor determination process may be used for phone number skip tracing or skip tracing for other types of contact information.

Thus, a cloud-based service has been described which manages the data interchange with a plurality of vendors providing skip tracing services according to waterfall logic which identifies and/or sequences different products and services of the different vendors. The present invention contemplates numerous variations, options, and alternatives as may be appropriate in different circumstances. The present invention is not to be limited to the specific embodiments described herein.

What is claimed is:
1. A method executed at least in part in a computing device for providing cloud based skip tracing, the method comprising:
providing a cloud based service enabling data interchange with a plurality of vendors providing skip tracing services;

receiving at the cloud based service and from a user a file of records for skip tracing, the file of records including client data including names;

selecting a waterfall process, wherein the selecting the waterfall process is based on an analytical model;

applying the waterfall process to the records using the computing device wherein the waterfall process includes at least a subset of the plurality of vendors;

processing results of the applied waterfall process, including validating the results and identifying duplicate results;

returning to the user a results file containing skip tracing results corresponding to the records;

receiving at the cloud based service and from the user a return file associated with the results file, the return file identifying contacts made with customers identified in the records;

generating a waterfall score card and sending the waterfall score card to the user, the waterfall score card summarizing performance of the subset of the plurality of vendors;

wherein the analytical model is derived from an analysis component analyzing a plurality of return files from users, each of the return files providing information identifying contacts made with customers identified in the records, the analytical model including conditional statements, and being based on a statistical model that determines a path of the file of records through the skip tracing;

wherein the waterfall process includes applying cost constraints, wherein the cost constraints include a maximum cost per record for each waterfall such that records are returned to the client once the maximum cost per record is reached;

wherein the waterfall process includes a time frame constraint to allow the user to acquire some records regardless of vendor processing issues.

2. The method of claim 1 further comprising selecting the waterfall process before applying the waterfall process.

3. The method of claim 1 wherein the analytical model is industry specific.

4. The method of claim 1 further comprising determining a probability of a hit per vendor and an expected probability of a contact per vendor using the analytical model for each of the plurality of vendors.

5. The method of claim 4 further comprising selecting the subset of the plurality of vendors using the analytical model.

6. The method of claim 5 further comprising sequencing the subset of the plurality of vendors for the waterfall process using the analytical model.

7. The method of claim 1 wherein the results file includes phone numbers for the records.

8. The method of claim 1 further comprising deduping results from different vendors within the subset of the plurality of vendors.

9. The method of claim 1 wherein the cloud based service provides for multiple levels of the skip tracing services.

10. The method of claim 9 further comprising receiving at the cloud based service a selection of a level of service from the multiple levels of skip tracing services.

11. The method of claim 10 further comprising receiving at the cloud based service a selection of a package type.

\* \* \* \* \*